US008836163B2

(12) United States Patent
Li et al.

(10) Patent No.: US 8,836,163 B2
(45) Date of Patent: Sep. 16, 2014

(54) ADAPTIVE CONTROLLER FOR STATCOM TO ENHANCE VOLTAGE STABILITY

(75) Inventors: Fangxing Li, Knoxville, TN (US); Yao Xu, Knoxville, TN (US); Kevin Tomsovic, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 388 days.

(21) Appl. No.: 13/396,407

(22) Filed: Feb. 14, 2012

(65) Prior Publication Data

US 2013/0207620 A1 Aug. 15, 2013

(51) Int. Cl.
*H02J 1/12* (2006.01)
(52) U.S. Cl.
USPC .............................................. 307/46; 363/65
(58) Field of Classification Search
CPC ........................... H02P 25/085; H02K 19/103
USPC ............ 318/400.02, 455, 490, 701, 721, 727, 318/798, 800, 802; 700/34, 295, 297, 298; 363/34–39, 41–43, 65–70, 97–98; 307/44, 46, 64–67
See application file for complete search history.

(56) References Cited

U.S. PATENT DOCUMENTS

| | | | |
|---|---|---|---|
| 6,031,738 A * | 2/2000 | Lipo et al. ...................... | 363/37 |
| 6,963,187 B2 * | 11/2005 | Bebic et al. .................... | 323/207 |
| 7,117,044 B2 * | 10/2006 | Kocher et al. ................... | 700/34 |
| 7,944,184 B2 | 5/2011 | Choy et al. | |
| 8,154,896 B2 * | 4/2012 | Angquist ...................... | 363/129 |
| 8,275,488 B2 * | 9/2012 | Kim et al. ...................... | 700/287 |
| 2004/0071000 A1 | 4/2004 | Escobar et al. | |
| 2008/0232343 A1 | 9/2008 | Nguyen et al. | |
| 2009/0251111 A1 | 10/2009 | Choy et al. | |
| 2010/0171472 A1 | 7/2010 | Angquist | |
| 2011/0074367 A1 | 3/2011 | Yoon et al. | |

OTHER PUBLICATIONS

PCT International Search Report and Written Opinion mailed Jun. 2, 2013, 11 pages, received by facsimile on Jul. 2, 2013 at Cameron LLP.
Li, Fran et al., "A Preliminary Analysis of the Economics of Using Distributed Energy as a Source of Reactive Power Supply," Oak Ridge National Laboratory, ORNL/TM-2006/014, Apr. 2006, 74 pages, see chapters 3 and 4.
Jain, Amit et al., "Voltage Regulation with STATCOMs: Modeling, Control and Results," IEEE Transactions on Power Delivery, vol. 21, No. 2, Apr. 2006, pp. 726-735.
Soto, Diego, "Nonlinear Control Strategies for Cascaded Multilevel STATCOMs," IEEE Transaction on Power Delivery, vol. 19, No. 4, Oct. 2004, pp. 1919-1927.

(Continued)

*Primary Examiner* — Rajnikant Patel
(74) *Attorney, Agent, or Firm* — Cameron LLP

(57) ABSTRACT

An adaptive controller for a static compensator (STATCOM) to enhance voltage stability comprises an outer voltage regulator loop and an inner current regulator loop. Each of the outer loop and the inner loop comprises a proportional integral controller. The outer loop adjusts proportional and integral control gains of voltage regulator. The inner loop adjusts proportional arid integral parts of current regulator gains. The automatic adjustment of these regulator gains is adaptively determined such that the voltage at the controlled bus follows a desired voltage, reference curve over time returning to a desired steady-state condition under various disturbances such as changes in load and/or transmission network. Thus, the adaptive controller can achieve a plug-and-play feature for a STATCOM without human intervention.

20 Claims, 12 Drawing Sheets

(56) References Cited

OTHER PUBLICATIONS

Liu, Feng et al., "The Nonlinear Internal Control of STATCOM: Theory and Application," Elsevier, Electrical Power and Energy Systems 25 (2003), pp. 421-430.

Hochgraf, Clark et al., Statcom Controls for Operation with Unbalanced Voltages, IEEE Transactions on Power Delivery, vol. 13, No. 2, Apr. 1998, pp. 538-544.

Valderrama, Gerrardo et al., "Reactive Power and Unbalance Compensation Using STATCOM with DissipativityBased Control," IEEE Transactions on Control Systems Technology, vol. 9, No. 5, Sep. 2001, pp. 718-727.

Wang, H. F., "Phillips-Heffrom Model of Power Systems Installed With STATCOM and Applications," IEE Proc.—Gener. Transm. Distrib., vol. 146, No. 5, Sep. 1999, pp. 521-527.

Wang, H. F., "Applications of Damping Torque Analysis to STATCOM Control," Elsevier, Electrical Power and Energy Systems 22, (2000), pp. 197-204.

Norouzi, Amir et al., "Two Control Schemes to Enhance the Dynamic Performance of the STATCOM and SSSC," IEEE Transactions on Power Delivery, vol. 20, No. 1, Jan. 2005, pp. 435-442.

El-Moursi, M. S. et al., "Novel Controllers for the 48-Pulse VSC STATCOM and SSSC for Voltage Regulation and Reactive Power Compensation," IEEE Transactions on Power Systems, vol. 20, No. 4, Nov. 2005, pp. 1985-1997.

Li, Huijuan et al., "Adaptive Voltage Control with Distrributed Energy Resources: Algorithm, Theoretical Analysis, Simulation, and Field Test Verification," IEEE Transactions on Power Systems, vol. 25, No. 3, Aug. 2010, pp. 1638-1647.

Rao, Pranesh et al., "STATCOM Control for Power System Voltage Control Applications," IEEE Transactions on Power Delivery, vol. 15, No. 4, Oct. 2000, pp. 1311-1317.

Chen, Woei-Luen et al., "Controller Design for an Induction Generator Driven by a Variable-Speed Wind Turbine," IEEE Transactions on Energy Conversion, vol. 21, No. 3, Sep. 2006, pp. 625-635.

Luo, An et al., "Fuzzy-PI-Based Direct-Output-Voltage Control Strategy for the STATCOM Used in Utility Distribution Systems," IEEE Transactions on Industrial Electronics, vol. 56, No. 7, Jul. 2009, pp. 2401-2411.

Rahim, A.H.M.A. et al., "Fuzzy STATCOM Control Strategies for Power System Stabilization," ACSE Journal, vol. 6, Issue 2, Jun. 2006, ICGST, pp. 1-9.

Mak, L. O. et al., "STATCOM with Fuzzy Controllers for Interconnected Power Systems," Elsevier, Electrical Power Systems Research 55 2000, pp. 87-95.

Schauder, C. et al., "Vector Analysis and Control of Advanced Static VAR Compensators," IEE Proceedings—C, vol. 140, No. 4, Jul. 1993, pp. 299-306.

Papic, I. et al., "Basic Control of Unified Power Flow Controller," IEEE Transactions on Power Systems, vol. 12, No. 4, Nov. 1997, pp. 1734-1739.

Sen, Kalyan K., "STATCOM—STATic Synchronous COMpensator: Theory, Modeling, and Applications," IEEE, 1998, 0-7803-4403-0/98, pp. 1177-1183.

\* cited by examiner

ADAPTIVE CONTROLLER FOR STATCOM TO ENHANCE VOLTAGE STABILITY

FIELD OF THE INVENTION

The present invention generally relates to an adaptive controller for a static compensator (STATCOM) to enhance voltage stability and, more; particularly, to such an adaptive controller which dynamically adjusts proportional and integral parts of the voltage regulator gains and the current regulator gains and to improve STATCOM control in power systems.

BACKGROUND

Voltage stability is a critical consideration in improving the security and reliability, for example, of power systems of public utilities and those power systems used in industry. The Static Compensator (STATCOM), a popular device for reactive power control based on gate turn-off (GTO) thyristors, has attracted much interest in the last decade for improving power system stability; see, for example, Fangxing Li (the present inventor) et al, 2006, *A preliminary analysis of the economics of using distributed energy, as a source of reactive power supply. Oak Ridge National Laboratory (ORNL) Technical Report* (ORNL/TM-2006/014), Oak Ridge, Tenn., April 2006. Various control methods have been proposed for STATCOM control. Amit Jain et al, in *Voltage regulation with STATCOMs: Modeling; control and results, IEEE Tram. Power Del*, vol. 21, no. 2, pp. 726-735, April 2006 among others introduced nonlinear optimal control. Clark Hochgraf et al., in *STATCOM Controls for Operation With Unbalanced Voltage. IEEE Trans. Power Del.*, vol. 13, no. 2, pp. 538-544, April 1998, presented a synchronous frame voltage regulator to control system voltage by using separate, regulation loops for positive and negative sequence components of the voltage. Gerardo E. Valderrama et al., in *Reactive Power and Unbalance Compensation Using STATCOM with Dissipativity-Based Control. IEEE Trans. Control Sysf. Technol*, vol. 19, no. 5, pp. 598-608, September 2001, proposed proportional integral (PI) structures with feed forward to improve STATCOM performance. H. F. Wang, for example, in *Phillips-Heffron model of power systems installed with STATCOM and applications, IEE Proc.-Gener. Transmi. Distib.*, vol. 146, no 5, pp. 521-527, September 1999 introduced a STATCOM damping controller to offset the negatiye; damping effect and enhance system oscillation stability. These non-patent literature articles mainly focus on the control structure design rather than exploring how to set PI control gains.

In many STATCOM systems, the control logic is implemented with PI controllers. The control parameters or gains play a key factor in performance. Presently, few studies have been, carried put on the control parameter settings. In many practices, the, PI controller gains are designed in a case-by-case study or trial-and-errpr.approach with tradeoffs ifi performance and efficiency. Generally speaking, it is hot feasible for utility engineers to perform extensive trial-and-error studies to find suitable parameters for each new STATCOM connection. Further, even if the control gains have been tuned to fit reasonable projected scenarios, performance may disappoint when a considefable change of the system conditions occurs, such as, for example, when a transmission line upgrade cuts layer replacing an old transmission line. The response can be particularly worse if the transmission topology change is due to an unexpected contingency. Thus, the STATCOM control system may not perform well when it is needed most.

A few, but limited, previous works in the non-patent-literature discuss the STATCOM PI controller gains in order to better enhance voltage stability and to avoid time-consuming tuning. Pranesh Rao et al. , in *STATCOM Control for Power System. Voltage Control Applications. IEEE, Trans. Power Del.*, vol. 15, no, 4, pp. 1311-1317, October 2000, among others, propose a linear optimal,control based on linear quadratic regular (LQR) control. Since the gains in such LQR control depend on a designer's choice of factors of a weighting matrix, the optimal parameters depend on me designer's experience.

An Luo et al. in *Fuzzy-PI-Based Direct-Output-Voltage Control Strategy for the STATCOM Used in Utility Distribution Systems. IEEE Trans. Ind. Electron.*, vol. 56, no. 1, pp. 2401-2411, July 2009 among others propose a fuzzy PI control method to tune PI controller gains. However, the fuzzy control method essentially gives an approximate recommendation. It is still up to the designer to choose the fixed deterministic gains. Therefore, again, the designer's experience may affect the final results. Further, a tradeoff of performance and the variety of operation conditions still has to be made during the designer's decision-making process.

A motivation in the art may be to design a control method that can ensure a quick and desirable response when the system operation condition varies in an expected or even an unexpected manner. The change of the external conditions; should not have ;a significant negative impact on the performance. Here the negative impact may refer to slower response, overshoot, or even instability of a power system. Based on this; fundamental motivation, an adaptive control approach for STATCOM to enhance voltage stability is an object of the present invention.

Given the foregoing, what is needed is a method and apparatus for adaptively controlling a static compensator (STATCOM) for a power system to enhance voltage stability whenever a negative impact on the power system performance occurs.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present invention meets the above-identified needs by providing an adaptive control method and apparatus in which the PI control parameters are self-adjusted automatically, given different disturbances in the system. When a disturbance occurs, the PI control parameters can be computed automatically in every sampling time period and adjusted in realtime to track the reference voltage. Hence, the PI control parameters are dynamically and automatically adjusted such that the desired performance can be always achieved. The method, according to one embodiment, will not be:affected by the initial settings and is robust with respect to changes of system conditions. In this way, the STATCOM becomes a "plug and play" device. In addition, an embodiment of the present invention also demonstrates a fast, dynamic performance of STATCOM under widely varying operating conditions.

An embodiment of apparatus for adaptive control for a static compensator (STATCOM) for a power system comprises a voltage regulator outer loop and a current regulator inner loop. The voltage regulator outer loop comprises a comparator for initially setting proportional and integral parts of voltage regulator gains and comparing a voltage reference value over time, to a measured bus voltage value. The outer loop further comprises a proportional integral controller and an 'adjustment' circuit, responsive to the comparator, for adjusting the proportional and integral parts of the voltage regulator gain, the adjustment circuit being connected in parallel to the output of the comparator, the adjustment circuit outputting the adjusted parts to the proportional integral controller. The output of the proportional integral controller is q-axis reference current; (or just q reference current for simplicity) value input to a minimum, maximum current limiter circuit. The current regulator inner loop comprises similar elements as the voltage regulator outer loop where the outer loop comparator compares the q-axis reference current value output of the limiter circuit with a q-axis current (or just q current for simplicity) to adjust phase angle. The DC voltage in the STATCOM is so modified to provide an exact amount of reactive power into the system to keep a bus voltage at a desired value.

An embodiment of a method for adaptive control for a static compensator for a power system comprises measuring a bus voltage of the power system, comparing the measured bus voltage with an desired reference value, obtaining a q-axis reference current value if the measured bus voltage is not equal to the desired preference value by adjusting voltage regulator gains and injecting reactive power from a static compensator into the power system if the q-axis reference current does not compare with a measured q-axis current.

Further features and advantages of the present invention are described in detail below with reference to the accompanying drawings wherein similar reference characters denote similar elements.

BRIEF DESCRIPTION OF THE DRAWINGS

The features and advantages of the present invention will become more apparent from the detailed description set forth below when taken in conjunction with the drawings in which like reference numbers indicate identica/or functionally similar elements.

DETAILED DESCRIPTION

Figure 1:
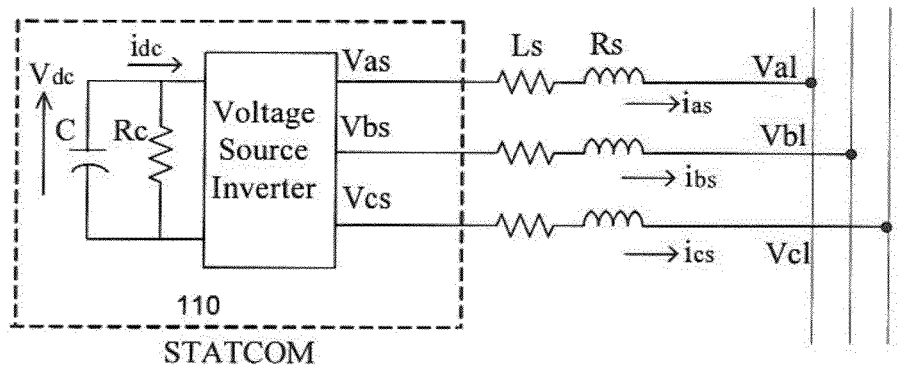
FIG. 1 is a PRIOR ART equivalent circuit diagram of a static compel

The present invention is directed to adaptive control of a static compensator (STATCOM) for a power system as shown by way of example in the drawings of FIGS. 1-14 and FIGS. 3A and 3B in particular in which in all drawings similar elements are denoted using similar reference characters. In any embodiment where the invention is implemented using; software, the software may be stored in a computer program product arid loaded into a computer system for adaptive control of a static compensator, for example, using a removable storage drive, hard drive or communications interface (riot shown). The control logic (software), when executed by a computer processor, causes the processor to perform the functions of the invention as described herein.

In another embodiment, the invention may be implemented primarily in hardware using, for example, hardware components such as application specific integrated circuits (ASICs), digital signal processors (DSP's), microcontrollers, etc. or other hardware controller known in the art; In yet another embodiment, the: invention may be implemented in a combination of software and hardware. Implementation of the hardware state machine so as to perform the functions described herein will be apparent to persons skilled in the relevant art(s).

Figure 2:
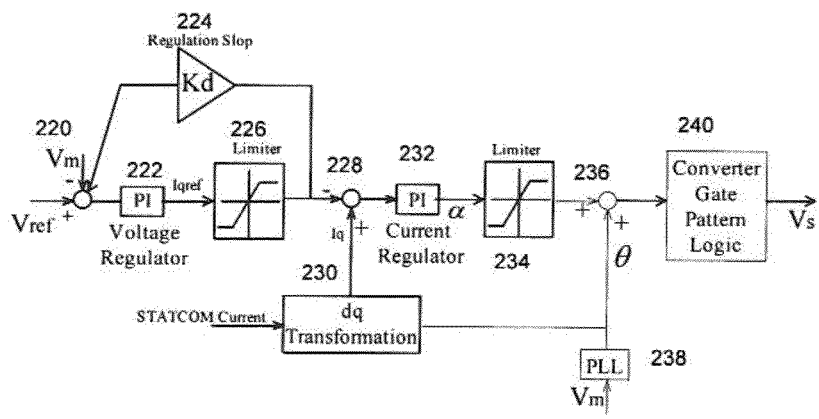
FIG. 2 is a PRIOR ART control block diagram of a traditional static compensator proportional integrator (PI).
Figure 3A:
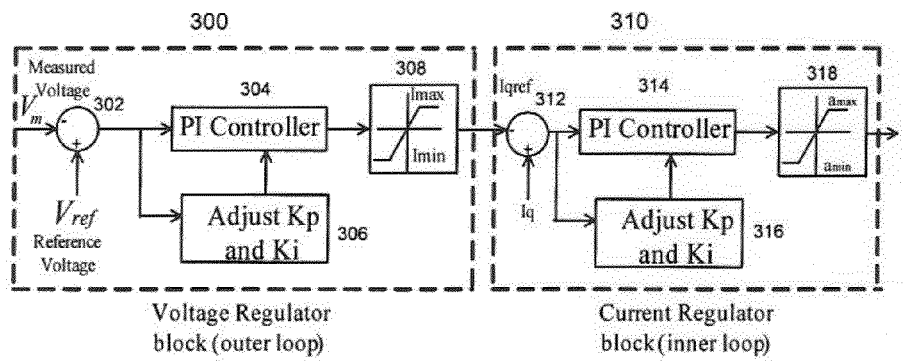
FIG. 3A is a block schematic diagram of an adaptive control for a static compensator including a voltage regulator outer loop and a current regulator inner loop, each including a proportional integrator according to an embodiment of the present invention.
Figure 3B:
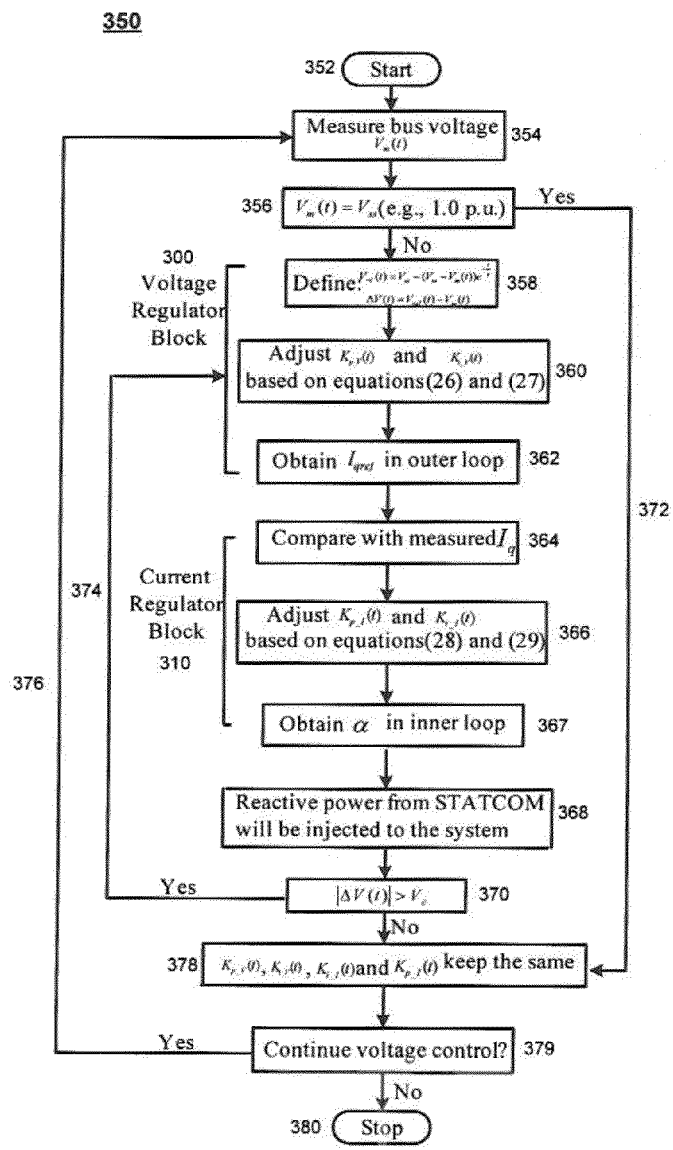
FIG. 3B is a flowchart of a method of adaptive control for the block schematic diagram of FIG. 3A.

In an embodiment, with reference, to FIGS. 3A and 3B, the present invention provides a voltage regulator block (outer loop) 300 comprising a comparator 302, a PI controller 304, a proportional and integral part gain controller, adjustment circuit 306 connected to the comparator 302 for providing a control input to the PI controller 304, and an $I_{max}$, $I_{min}$ output limiter circuit 308 connected to the output of the PI controller 304 for providing a q-axis reference, current input to current regulator block 310 (inner loop) which outputs phase angle in a similar manner via comparator 312, PI controller 314, adjustment circuit 316 and angle output limiter circuit 318. Having briefly introduced the adaptive control of the present invention, a typical static compensator and PI controller will be discussed with reference to FIGS. 1 and 2.

An equivalent circuit of a STATCOM 100 is shown in FIG. 1; The center of a STATCOM 100 is a voltage source inverter 110 having an Rc/C parallel circuit providing an $i_{dc}$ input. Out of the inverter 11-0 is provided the three phase output voltages to a power system. In this power system, the resistance Rs in series with the voltage source inverter 110 represents the sum of the transformer winding resistance losses and the inverter 110 conduction losses. The inductance, represents theleakage inductance of the transformer. The resistance Rc in shunt with the capacitor C represents the sum of the switching losses of the inverter 110 and the power losses in the capacitor C. A STATCOM 100 may consist of a steprdoyvn transformer (not; shown), a pulse inverter and a capacitor or other design known in the art. In FIG. 1, $v_{as}$, $V_{bs}$, and $v_{cs}$ are the three-phase STATCOM output voltages; $v_{al}$, $v_{hl}$, and $v_{cl}$ are the three phase bus voltages; $i_{as}$, $i_{hs}$, and and $i_{cs}$ are the three-phase STATCOM output currents.

STATCOM Dynamic Model

The three-phase mathematical expressions of the STATCOM can be written in the following form:

$$L_s \frac{di_{as}}{dt} = -R_s i_{as} + V_{as} - V_{al} \quad (1)$$

$$L_s \frac{di_{bs}}{dt} = -R_s i_{bs} + V_{bs} - V_{bl} \quad (2)$$

$$L_s \frac{di_{cs}}{dt} = -R_s i_{cs} + V_{cs} - V_{cl} \quad (3)$$

$$\frac{d}{dt}\left(\frac{1}{2}CV_{dc}^2(t)\right) = -[V_{as}i_{as} + V_{bs}i_{bs} + V_{cs}i_{cs}] - \frac{V_{dc}^2}{R_c} \quad (4)$$

In order to conveniently analyze the balanced three-phase system, the three-phase voltages and currents are converted to synchronous rotating frame by abc/dq transformation. By this rotation, the control problem is greatly simplified since the system variables become DC values under the balanced condition. Further, multiple control variables are decoupled such that the use of classic control method is possible. The transformation: from phase variables to d and q coordinates is given as follows:

$$[C] = \frac{2}{3}\begin{bmatrix} 1 & -\frac{1}{2} & -\frac{1}{2} \\ 0 & \frac{\sqrt{3}}{2} & -\frac{\sqrt{3}}{2} \\ \frac{1}{\sqrt{2}} & \frac{1}{\sqrt{2}} & \frac{1}{\sqrt{2}} \end{bmatrix} \quad (5)$$

$$\begin{bmatrix} i_{ds} \\ i_{qs} \\ 0 \end{bmatrix} = [C]\begin{bmatrix} i_{as} \\ i_{bs} \\ i_{cs} \end{bmatrix} \quad (6)$$

$$\begin{bmatrix} V_{ds} \\ V_{qs} \\ 0 \end{bmatrix} = [C]\begin{bmatrix} V_{as} \\ V_{bs} \\ V_{cs} \end{bmatrix} \quad (7)$$

where $I_{ds}$ and $i_{qs}$ are the d and q currents corresponding to $i_{as}$, $i_{bs}$, and $i_{cs}$; $V_{ds}$ and $V_{qs}$ represent the d and q voltages corresponding to $v_{as}$, $V_{bs}$, and $V_{cs}$.

The output voltage of the STATCOM can be expressed as:

$$\begin{cases} V_{ds} = KV_{dc}\cos(\alpha) \\ V_{qs} = KV_{dc}\sin(\alpha) \end{cases} \quad (8)$$

where K is a factor that relates the DC voltage to the peak phase-to-neutral voltage on the AC side; $V_{dc}$ is the DC-side voltage; a is the phase angle which the STATCOM output voltage leads the bus voltage.

Using the abc/dq transformation, the equations from (1) to (4) can be rewritten as:

$$\frac{d}{dt}\begin{bmatrix} i_{ds} \\ i_{qs} \\ V_{dc} \end{bmatrix} = \begin{bmatrix} -\frac{R_S}{L_S} & \omega & \frac{K}{L_S}\cos\alpha \\ -\omega & -\frac{R_S}{L_S} & \frac{K}{L_S}\sin\alpha \\ -\frac{3K}{2C}\cos\alpha & -\frac{3K}{2C}\sin\alpha & -\frac{1}{R_cC} \end{bmatrix}\begin{bmatrix} i_{ds} \\ i_{qs} \\ V_{dc} \end{bmatrix} - \frac{1}{L_S}\begin{bmatrix} V_{dl} \\ V_{ql} \\ 0 \end{bmatrix} \quad (9)$$

where $\omega$ is the synchronously rotating angle speed of the voltage vector; $V_n$ and $V_{yl}$ represent the d and q axis voltage corresponding to $V_{al}$, $V_{bl}$, and $V_{cl}$. Since $V_{ql}=0$, based on the instantaneious active and reactive, power definition, (10) and (11) can be obtained; as follows $$p_l = \frac{3}{2}V_{dl}i_{ds} \quad (10)$$

$$q_l = \frac{3}{2}V_{dl}i_{qs} \quad (11)$$

Based on the above equations, the traditional STATCOM control strategy can be obtained, and a PRIOR ART STATCOM control block diagram is shown in FIG. 2.

Referring now to PRIOR ART FIG. 2, the phase locked loop (PLL) 238 provides the basic synchronizing signal which is the reference angle to the measurement system. Measured bus line voltage $V_{an}$ is compared with the reference voltage $V_{ref}$ at comparator 220 and the voltage regulator 222 provides the required reactive reference current $1_{qref}$ to limiter 226. The droop factor, $K_d$, is defined as the allowable voltage error at the rated reactive current flow through the STATCOM at regulation slop 224. The STATCOM reactive current $1_q$ from dq transformation 230 is compared with $1_{qref}$ at comparator 228. The output of the PI current regulator 232 is the angle phase shift α of the inverter voltage with respect to the. system voltage. The limiter 234 is the limit imposed on the value of control with the consideration of the maximum reactive power generation capability of the STATCOM 200.

Adaptive Control for STATCOM

FIG. 3A is an adaptive control block for a static compensator STATCOM according to one embodiment of the present invention and FIG. 3B provides a flowchart for an exemplary adaptive control method for use with the controller of FIG. 3A. The STATCOM with fixed PI control parameters of PRIOR ART static compensators may not achieve the desired response in a power system when the power system operating1 condition (e.g., loads or transmission lines and the like) change. An adaptive control method is presented in order to obtain the desired response and to avoid performing trial-and-error studies to find suitable parameters for PI controllers when a new STATCOM is.installed in a.power system. With an adaptive control method according to the present invention, the dynamical self-adjustment of PI control parameters can be realized.

Figure 4:
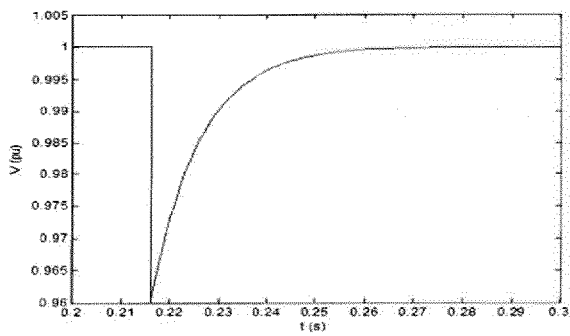
FIG. 4 is a representative reference voltage curve showing the setting of reference voltage to an initial steady-state voltage value, $V_{ss}$, of 1.0 per unit (p.u.) and, with time in seconds, dropping to about 96% of value and being restored to the reference value after a minimal passage of time.

A logical block diagram of this adaptive control method is shown in FIG. 3A havinga voltage regulator block (outer loop) 300 and a current regulator block (inner loop) 310. The measured voltage $V_m(t)$ and the reference voltage $V_{ref}(j)$ are in per unit values and are compared at comparator 302. In the outer loop and inner loop in the PI control logic 304, 314, the proportional and integral parts of the voltage regulator gains are denoted by $K_{p\_v}$ and $K_{i\_v}$, respectively. Similarly, the gains $K_{p\_I}$ and $K_{i\_I}$ represent the proportional and integral parts, respectively, of the current regulator block 310. In this control system, the allowable voltage error $K_d$ is set to 0. The $K_{p\_V}$, $K_{i\_V}$, $K_{p\_I}$ and $K_{i\_I}$ can be set to an arbitrary initial value such as simply 1.0. One exemplary desired curve is an exponential curve, shown in FIG. 4, is set as the reference voltage curve in the outer loop 300. Other curves may also be used than the depicted exponential curve so long as the measured voltage returns to the desired steady state voltage in a rapid manner. The process of adaptive voltage control method for STATCOM is described as follows:

(1) The bus voltage $V_m(t)$ is measured in real time.

(2) When the measured bus voltage over time $V_m(t) \neq V_{ss}$, the target steady-state voltage (which is set to 1.0 per unit (p.u.) in the discussion and examples), the measured voltage is compared with the reference voltage at comparator 302, Based on an exemplary reference voltage curve such as an exponential curve shown in FIG. 4, $K_{p\_v}$ and are dynamically adjusted at adjuster 306 and provided to the PJ controller 304 in order to make the measured voltage match the reference voltage, and the q-axis reference current $I_{ref}$ can be obtained at limiter 308.

(3). In the inner loop 310, $I_{ref}$ is compared with the q-axis current $_q$ at comparator 312. Using the similar control method to the one for the outer loop 300, the parameters $K_{p\_I}$ and $K_{i\_I}$ may be adjusted at adjuster 316 based on the error. Then, a suitable phase angle can be found at the output of limiter 318. The DC voltage in the STATCOM controlled according to FIG. 3A can be modified such that a STATCOM provides the exact amount of reactive power injected into the power system to keep the bus voltage at a desired value.

It should be noted that the current $I_{max}$ and $I_{min}$ and the angle $\alpha_{max}$ and $\alpha_{min}$ are the limits imposed with the consideration of the maximum reactive power generation capability of the STATCOM controlled in this manner. If one of the maximum or minimum limits is reached, the maximum capability of the STATCOM to inject reactive power has been reached. Certainly, as long as the STATCOM sizing has been appropriately studied during planning stages for inserting the STATCOM into the power system, the STATCOM should not reach its limit unexpectedly.

Since the inner loop control 310 is similar to the outer loop control 300, only the mathematical method to automatically adjust PI controller 304 gains in the outer loop 300 is discussed in this section for illustrative purpose. Similar analysis can be applied to the inner loop 310.

Here the measured bus voltages of three phases are denoted by $V_{al}(t)$, $V_{bl}(t)$, and $V_{cl}(t)$, respectively. Then, $v_{dl}(t)$ and $v_{ql}(t)$ can be computed with d-q transformation.

$$\begin{bmatrix} V_{dl}(t) \\ V_{ql}(t) \\ 0 \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \\ \frac{1}{\sqrt{2}} & \frac{1}{\sqrt{2}} & \frac{1}{\sqrt{2}} \end{bmatrix} \begin{bmatrix} V_{al}(t) \\ V_{bl}(t) \\ V_{cl}(t) \end{bmatrix} \quad (12)$$

Then, we have $$V_m(t) = \sqrt{V_{dl}^2(t) + V_{ql}^2(t)} \quad (13)$$

Based on $V_m(t)$, the reference voltage $V_{ref}(t)$ is set as $$V_{ref}(t) = V_{ss} - (V_{ss} - V_m(t))e^{-\frac{t}{\tau}}.$$

If the system is operating in the normal condition, then $V_m(t) = 1$ p.u., and thus, $V_{ref}(t) = 1$ p.u. This means that $K_{p\_v}$ and $K_{i\_v}$ will not change and the STATCOM will not inject or absorb any reactive power to maintain the voltage meeting the reference voltage. However, once there is a voltage disturbance in the power system, based on $$V_{ref}(t) = V_{ss} - (V_{ss} - V_m(t))e^{-\frac{t}{\tau}},$$

$K_{p13v}$ and $K_{i\_v}$ will become adjustable and the STATCOM will provide reactive power to increase the voltage. Here, the error between $V_{ref}(t)$ and $V_m(t)$ is denoted by $_{\Delta V(t)}$ when there is a disturbance in the power system. Based on the adaptive voltage control model, at any arbitrary time instant t, the following equation can be obtained.

$$\Delta V(t) K_{p\_V}(t) + K_{i\_V}(t) \int_t^{t+T_S} \Delta V(t) dt = I_{qref}(t + T_s) \quad (14)$$

where $T_s$ is the sample time, which is set to $2.5 \times 10^{-5}$ second here as an example In this system, the Discrete-Time Integrator block in place of the Integrator block is used to create a purely discrete system, and the Forward-Euler method is used in the Discrete Time Integrator block. Therefore, the resulting expression for the output of the Discrete-Time Integrator block at t is $$y(t) = y(t-T_s) + K_{i\_v}(t-T_s) \times T_s \times \Delta V(t-T_s) \quad (15)$$

where $$y(t) = K_{i\_V}(t) \int_t^{t+T_S} \Delta V(t) dt;$$

$$y(t - T_s) = K_{i\_V}(t - T_s) \int_{t-T_S}^{t} \Delta V(t - T_s) dt.$$

Considering $y(t-T_s) = I_{qref}(t)$, we can rewrite (14) as follows;

$$\Delta V(t) K_{p\_V}(t) + K_{i\_V}(t) \int_t^{t+T_s} \Delta V(t) dt - \quad (16)$$

$$K_{i\_V}(t - T_s) \int_{t-T_s}^{t} \Delta V(t - T_s) dt = I_{qref}(t + T_s) - I_{qref}(t)$$

Over a short time duration, we can consider $K_{i\_v}(t) = K_{i\_v}(t-T_s)$. Hence, (16) can be rewritten as:

$$\Delta V(t) K_{p\_V}(t) + K_{i\_V}(t) \int_t^{t+T_s} A dt = I_{qref}(t + T_s) - I_{qref}(t) \quad (17)$$

where $A = \Delta V(t) - \Delta V(t-T_s)$.

Based on (16), if we can determine in an ideal response the ratio $$\frac{I_{qref}(t+T_s) - I_{qref}(t)}{\Delta V(t)}$$

and the ideal ratio $$\frac{K_{i\_V}(t)}{K_{p\_V}(t)},$$

the desired $K_{p\_v}$ and $K_{i\_v}(t)$ can be found.

Assume an ideal response of the form $$I_{qref}(t+T_s) = -I_{qref}(t) = R \times \Delta V(t) \quad (18)$$

since the system is desired to be stable, without losing generality, we may assume; that the bus voltage will return to 1 per unit in 5τ, where 5τ is the delay defined by users as shown, for example, in the exemplary curve of FIG. 4. Since $I_{qref}(t_0) = 0$ based on (14) and (18), (14) can be rewritten as:

$$\Delta V(t_0) K_{p\_V}(t_0) + K_{i\_V}(t_0) \int_{t_0}^{t_0+5\tau} \Delta V(t)\,dt = R \times \Delta V(t_0) \quad (19)$$

where $t_0$ is the time that the system disturbance occurs.

Set $K_{i\_v}(t_0^-) = 0$, then we have $$K_{p\_v}(t_0) = R \quad (20)$$

Set $K_{p\_v}(t_0^-) = 0$, then we have $$K_{i\_V}(t_0) = \frac{\Delta V(t_0) \times R}{\int_{t_0}^{t_0+5\tau} \Delta V(t)\,dt} \quad (21)$$

Now the ratio $$m_V = \frac{K_{i\_V}(t_0)}{K_{p\_V}(t_0)}$$

can be considered the ideal ratio of $K_{p\_v}(t)$ and $K_{i\_v}(t)$ after fault.

Thus, (18) can be rewritten as $$I_{qref}(t_0+5\tau) - I_{qref}(t_0) = k_v \times (\Delta V(t_0)) \quad (22)$$

Here $k_v$ can be considered as the steady-state and ideal ratio $$\frac{I_{qref}(t+T_s) - I_{qref}(t)}{\Delta V(t)}.$$

Based on the system bus capacity and the STATCOM rating, $\Delta V_{max}$ can be obtained, which means any voltage change greater than $\Delta V_{max}$ cannot return to 1 per unit. Since we have; $-1 \le I_{qref}(t) \le 1$, we have the following relation:

$$\frac{\Delta V(t_0)}{\Delta V_{max}} \times 1 = k_V \times \Delta V(t_0) \quad (23)$$

Based on (19), (22) and (23), $k_v$ can be calculated by:

$$k_V = \frac{R \times \Delta V(t_0)}{\left(K_{p\_V}(t_0) \times \Delta V(t_0) + K_{i\_V}(t_0) \int_{t_0}^{t_0+5\tau} \Delta V(t)\,dt\right) \times \Delta V_{max}} \quad (24)$$

In order to precisely calculate the PI controller gains, based on (17), we can derive.

$$\Delta V(t) K_{p\_V}(t) + m_V K_{p\_V}(t) \int_{t}^{t+T_S} A\,dt = k_V \times \Delta V(t) \quad (25)$$

Therefore, $K_{p\_V}(t)$ and $K_{i\_V}(t)$ can be computed by the following equations:

$$K_{p\_V}(t) = \frac{k_V \times \Delta V(t)}{\left(\Delta V(t) + m_V \times \int_{t}^{t+T_S} A\,dt\right)} \quad (26)$$

$$K_{i\_V}(t) = m_V \times K_{p\_V}(t) \quad (27)$$

Based on (26) and (27), $K_{p\_V}(t)$, and $k_{i\_V}(t)$ can be adjusted dynamically.

Using a similar process, the following expressions for current regulator PI gains can be obtained:

$$K_{p\_I}(t) = \frac{k_I \times \Delta I_q(t)}{\left(\Delta I_q(t) + m_I \times \int_{t}^{t+T_S} B\,dt\right)} \quad (28)$$

$$K_{i\_I}(t) = m_I \times K_{p\_I}(t) \quad (29)$$

where $\Delta I_q(t)$ is the error between $I_{qref}$ and $I_q$; $k_I$ is the steady and ideal ratio $$\frac{\alpha(t+T_s) - \alpha(t)}{\Delta I_q(t)}$$

and α(t) is the angle that phase shift of the inverter voltage with respect to the system voltage at time t; $m_I$ is the ideal ratio of the values of $K_{i\_I}(t)$ and $K_p(t)$ after fault; and B is equal to $\Delta I_q(t) - \Delta I_q(t-T_S)$.

Now referring: to; FIG. 3B, FIG. 3B is an exemplary flowchart diagram of a method of adaptive control of a STATCOM for the block schematic diagram of FIG. 3A. Using one of a hardware or software or. combination hardware/software embodiment of a STATCOM with adaptive control according to an embodiment of the present invention, adaptive control process 350 begins at step 352, Start. Start may include the activation of an adaptive control apparatus or programming of a processor or controller and adaptation of existing hardware or other means of implementing an adaptive control method into a power systerri in which enhanced voltage stability is desired in the event of certain disturbances to: operation of the power system as discussed further herein in a simulation results section. At step 354, the bus voltage over time $V_m(t)$ is sampled according to a desired sampling rate. At step 356, a question is asked: is $V_m(t)$ that has just been measured equal to $V_{ss}$, the desired steady-state voltage. If the answer is Yes, then via path 372, step 378 is reached, At step 378, then, there is no reason to change any of the identified parameters: $K_{p\_v}(t)$, $K_{i\_v}(t)$, $K_{i\_I}(t)$ and $K_{p\_I}(t)$. The power system is running smoothly. If we want to continuously perform the voltage control process which is usually the case, the answer to step 379 is Yes and the process 350 returns to step 354 via path 376 for another round of voltage and current measurement and control processes. Otherwise, the voltage control process stops at step 380.

On the other hand, if the answer at step 356 is No; then adaptive control begins. Steps 358, 360 and 362 find support in voltage regulator block (outer loop) 300. At step 358, once defines $$V_{ref}(t) = V_{ss} - (V_{ss} - V_m(t))e^{-\frac{t}{\tau}}; \tag{30}$$

$$\Delta V(t) = V_{ref}(t) - V_m(t) \tag{31}$$

An example of a $V_{ref}(t)$ function curve is shown in FIG. 4. Other exemplary curves may be used other than an exponential curve so long as the reference voltage curve returns rapidly to the desired steady state voltage. In other examples, a linear, quadratic, polynomial or step function,curve may be used to bring the voltage back to steady state so long as the voltage is brought back rapidly.

Once $V_{ref}$ and the change in voltage are defined, in step 358, in step 360 the proportional and integral parts of the voltage regulator gains $K_{p\_V}(t)$ and $K_{i\_V}(t)$ are adjusted in the voltage regulator block (outer loop) 300 based on the equations (26) and (27) above.

At step 362, the $I_{qref}$(q-axis reference current) is obtained in the outer loop 300 via limiter 308 and the output of the PI controller 304. As indicated above, step 362 concludes voltage regulator block (outer loop) 300. As will be discussed further herein the voltage regulator block 300 is.reentered via path 374 from a decisiopn step 370 yet to be discussed.

Current regulator block 310 comprises steps 364, 366 and 367. At step 364, the $I_{qref}$ is compared with a measured value of the q-axis current $I_q$ in the power system. At step 366, the proportional and integral parts of the current gains $K_{p\_v}(t)$ and $K_{i\_I}(t)$ are adjusted based on equations (28) and (29) given above. Referring briefly to current regulator block (inner loop) 310 of FIG. 3A, the adjustment is accomplished via adjuster 316 and PI controller 314 and the output current value provided to limiter 318.

At step 367, and, in response to the adjustment step 366, the phase angle α is determined in the inner loop and passed through a limiter 318 for output.

At step 368, a determined amount of reactive power from the static compensator (STATCOM) is injected into the power system to automatically restore the power adversely impacted by a disturbance detected at step 356. At step 370, the question is asked is the absolute value of $\Delta V(t)$ greater than a tolerance threshold, $V_\epsilon$, which is a very small value such as 0.0001 p. u. or $$|\Delta V(t)| > V_\epsilon$$

If the answer is yes, then the voltage regulator block and current regulator blocks are reentered until the change is less than the given threshold $V_\epsilon$. The voltage values of 1.0 p. u. for the target steady-state voltage $V_{ss}$ and 0.0001 p.u. for the voltage threshold $V_\epsilon$ are exemplary and may be changed depending on the power system requirements and other design choices.

If the answer is No, then, a disturbance has been automatically controlled and the values for $K_{p\_v}(t)$, $K_{i\_I}(t)$, $K_{p\_I}(t)$ and $K_{p\_I}(t)$ are maintained as determined by the last pass through the outer and inner control loops 300 and 310 at step 378. The process of FIGS. 3A and 3B may be periodically performed to determine if measured bus voltage is at $V_{ss}$(e.g., 1.0 p.u.) Now, simulation results will be discussed along with a simulation system per FIG. 5 and adapted per an adaptive control model of FIG. 6.

Simulation Results

Figure 5:
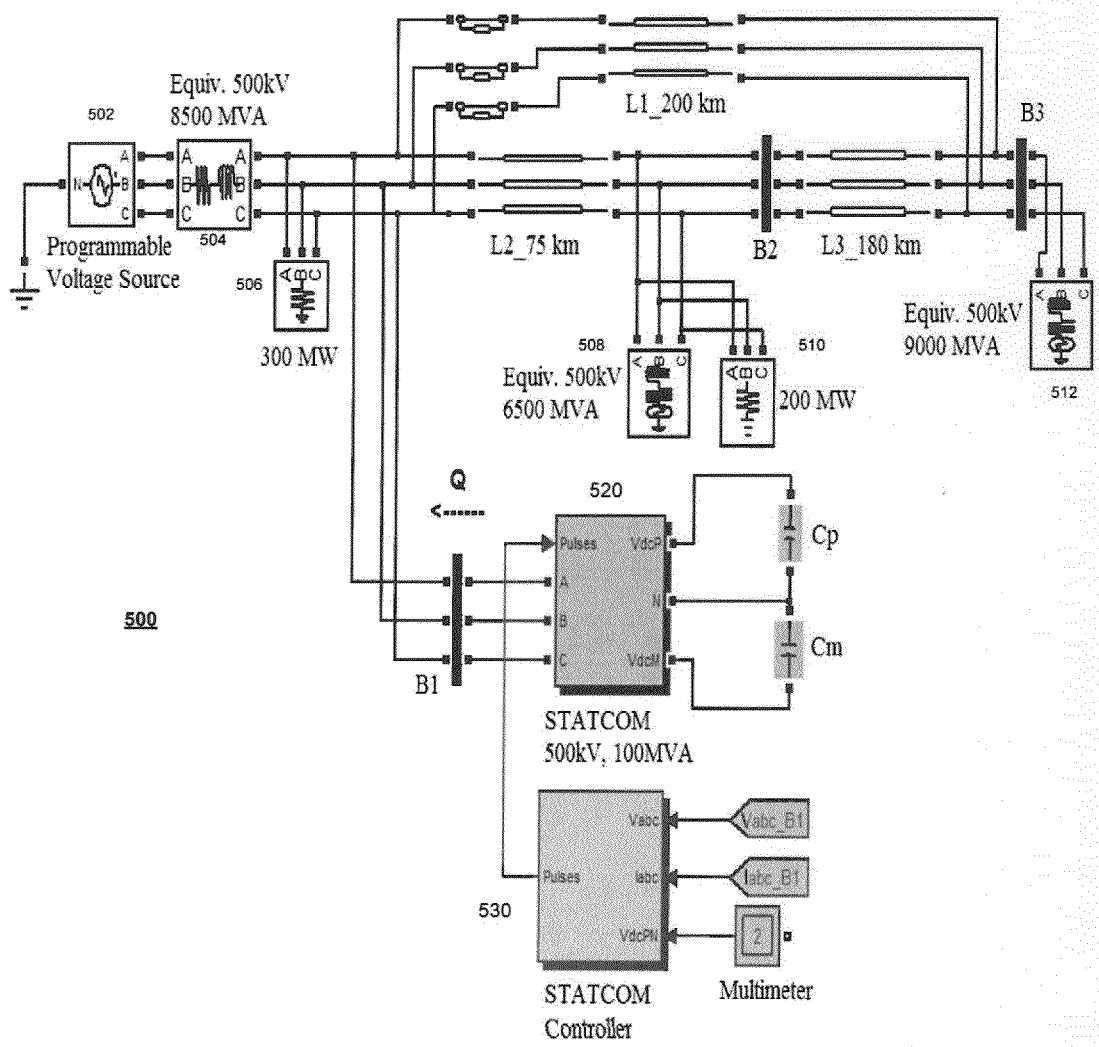
FIG. 5 is; a schematic block diagram of a simulation system for simulating the characteristics of adaptive control as depicted in FIGS. 3 and 4.

In the system simulation diagram shown in FIG. 5, a +/−100 MVAR STATCOM 520 is implemented with a 48-pulse VSC and connected to a 500 kV bus (100 MVA). This is a standard sample STATCOM system from a Matlab/ Simulink library. The STATCOM controller is denoted 530. A programmable;voltage source 502 is connected to an equivalent 500 kV 8500 MVA source 504 and a simulated network including a 300 MW load 506. Other sources 508 and 512 are shown along with another load 510, load 510 being 200 MW. Three-phase transmission lines of L2 75 km, L3 180 km and L1 200 km are shown along with buses B1 to B3. Bus B1, in particular, may be selected in the simulation as a voltage and current measurement point. Note that Vabc_B1 of STATCOM controller 530 is for receiving measured three-phase voltages A, B and C at bus B1 and Iabc_B1 represents a similar current measurement, value reception at controller 530. In other words, Vabc input represents step 356 and Iabc input repre- sentS:Step 364 of FIG. 3B. Thus, here, the attention is focused on the STATCOM control performance in a bus voltage regulation mode. In the original, traditional (PRIOR ART) model, the compensating reactive power injection and the regulation speed are mainly affected by PI controller parameters in the voltage regulator and, the current regulator. The original (PRIOR ART) control will be compared with the proposed adaptive control model according to the present invention.

Figure 6:
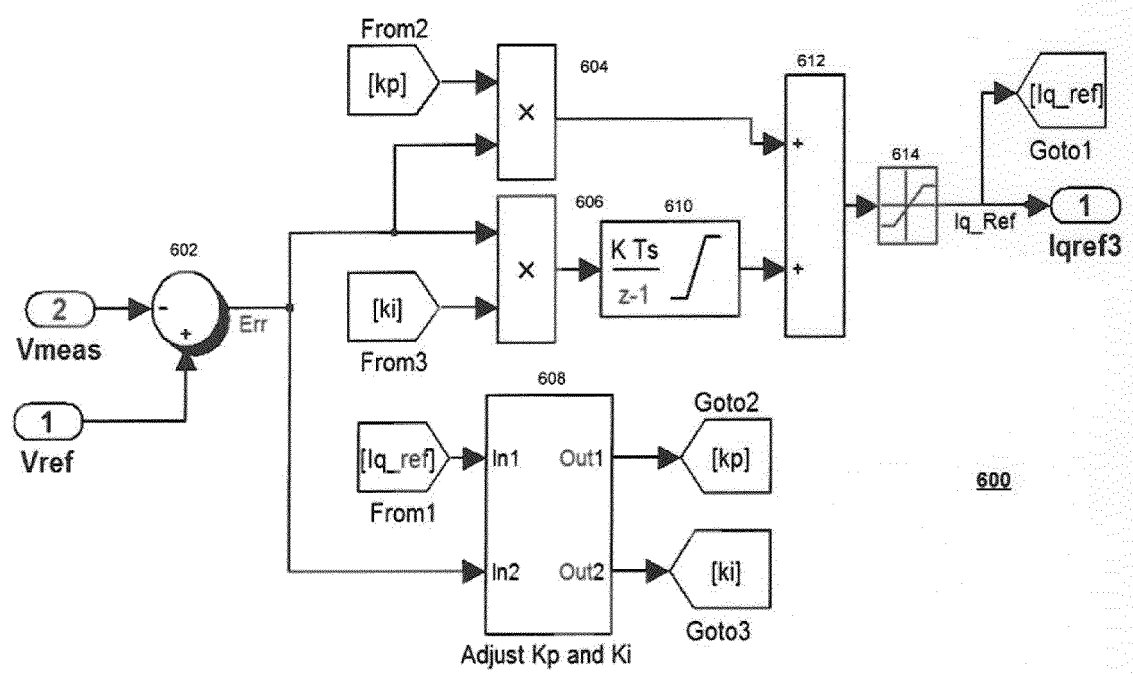
FIG. 6 represents an implementation of the adaptive control model for simulation purposes as depicted in FIGS. 3 and 4.

The adaptive control model is shown in FIG. 6 based on the discussion of FIGS. 3A and 3B above. FIG. 6 starts with Vmeas and Vref, for example, per FIG. 4 and comparator 602 to determine the error, denoted as Err. Iqref is calculated as result of 604, 606, 610, 612 and 614. Iqref then is an input to 608. For the proposed approach, the exemplary exponential curve as shown in FIG. 4 is chosen as the reference voltage Vref, and the PI controller 304, 314 parameters are adjustable as discussed above at 608. Other curves may be used in other embodiments.

The following four simulation studies assumes the steady-state voltage, $V_{ss}$=1.0 p.u. In the first three simulation studies, a disturbance is assumed to cause a voltage drop at 0.2 sec from 1.0 to 0.989 per unit at the source (substation). Here, the 0.989 p.u, voltage at the substation is the lowest voltage that the STATCOM system can support due to its capacity limit in this system. The fourth simulation study assumes a disturbance at 0.2 sec causing a voltage rise from 1.0 to 1.01 p.u. at the:source.(substation) under a modified transmission network. In all simulation studies, the STATCOM immediately operates after the disturbance with the expectation of bringing the voltage back to 1.0 p.u.

Response of the Original (PRIOR ARTY Model

In the original model, $K_{p\_v}$=12, $K_{i\_v}$=3000, $K_{p\_I}$=5, $K_{i\_I}$=40. The initial voltage source, shown in FIG. 5, is 1 p.u., with the voltage base being 500kV. In this case, if we set R=t then we have the initial my calculated as:

$$m_V = \frac{K_{i\_V}(t_0)}{K_{p\_V}(t_0)} = 770.8780.$$

Since in this case $\Delta V(t_0)=\Delta_{max}$ and $k_v=847425$; based on (26) and (29), we have $$K_{p\_V}(t) = \frac{84.7425 \times \Delta V(t)}{\Delta V(t) + 770.8780 \times \int_t^{t+T_S} Adt} \quad (32)$$

$$K_{i\_v}(t)=770.8780 \times K_{p\_dv}(t) \quad (33)$$

$$K_{p\_I}(t) = \frac{57.3260 \times \Delta I_q(t)}{\left(\Delta I_q(t) + 2.3775 \times \int_t^{t+T_S} Bdt\right)} \quad (34)$$

$$K_{i\_I}(t)=2.3775 \times K_{p\_I}(t) \quad (35)$$

Figure 7:
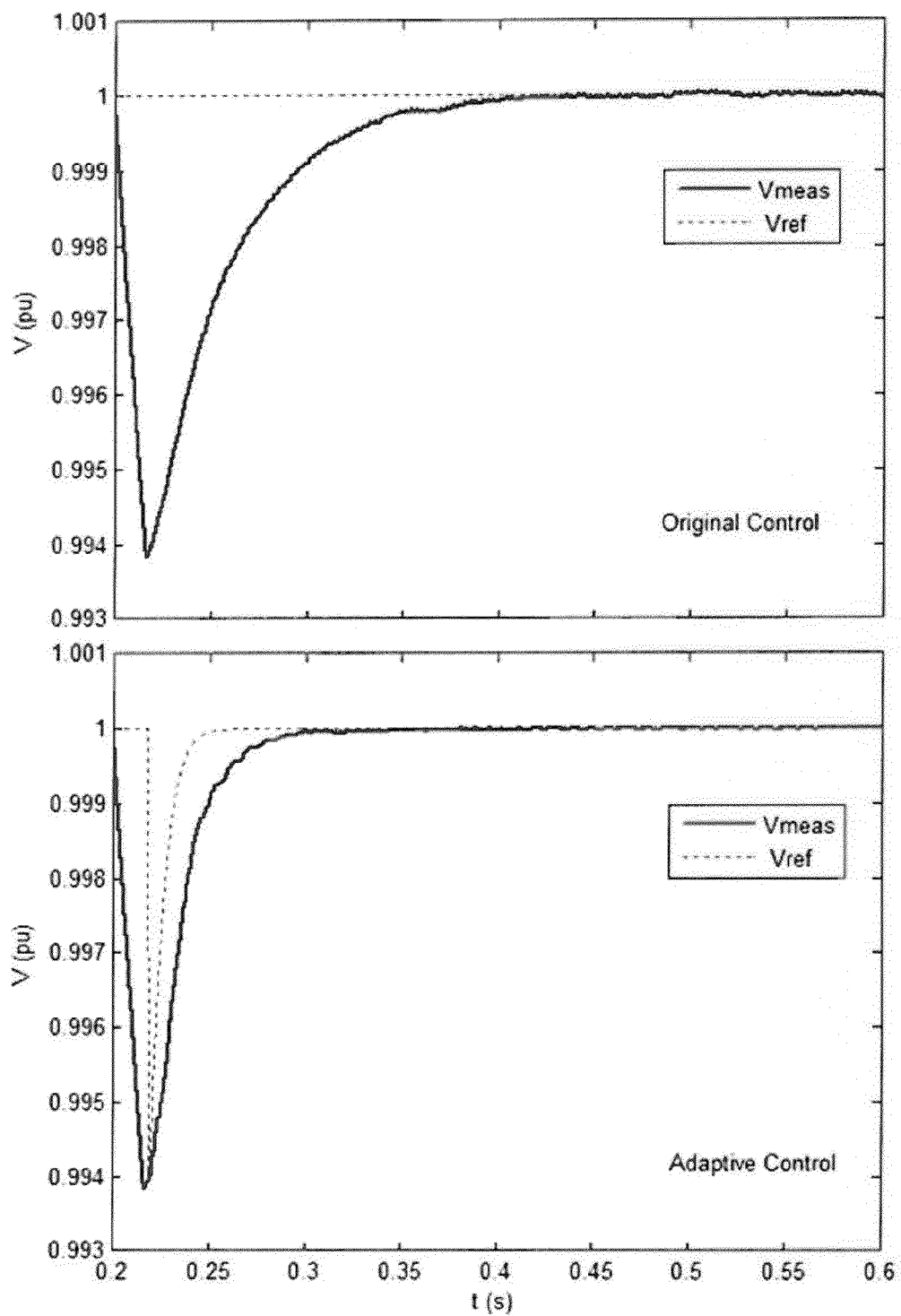
FIG. 7 provides graphical results of the voltages over time under original control versus adaptive control according to an embodiment of the present: invention wherein adaptive control provides faster recovery of measured bus voltage in a simulation system and using the same network and loads.
Figure 8:
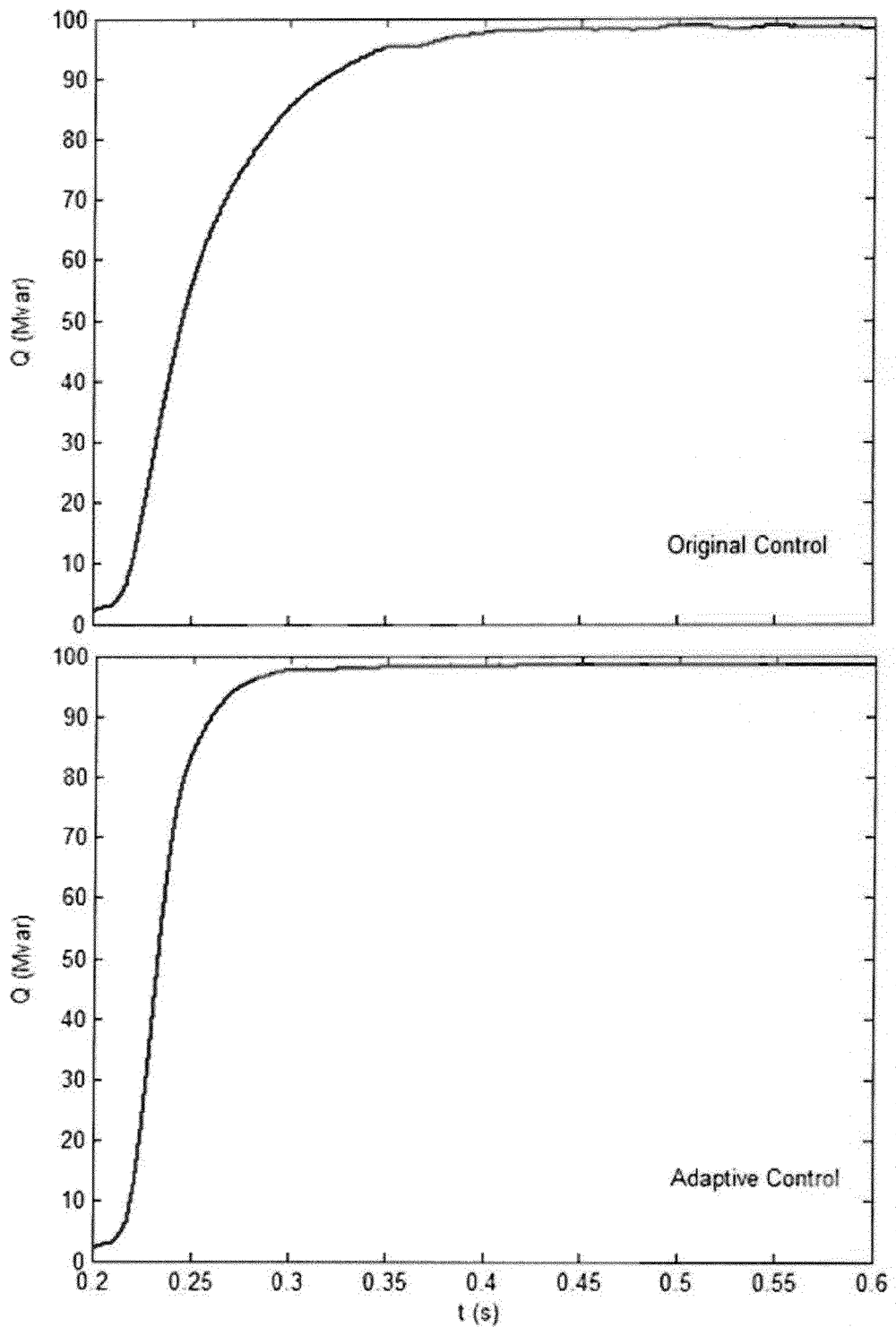
FIG. 8 provides graphical results of the output reactive power layer time using the same simulation network and loads as FIG. 5-7.

Based on (32) to (35), the adaptive control system can be designed and the results of an original (PRIOR ART) STATCOM control method and the adaptive control method of the present invention are shown in FIG. 7 and FIG. 8, respectively. Observations are summarized in Table I below:

TABLE I

| | Original Control | Adaptive Control |
|---|---|---|
| Lowest Voltage after disturbance | 0.9938 p.u. | 0.9938 p.u. |
| Time (sec) when V = 1.0 | 0.4095 sec | 0.2983 sec |
| $\Delta t$ to reach V = 1.0 | 0.2095 sec | 0.0983 sec |
| Var Amount at steady state | 97.76 MVar | 97.65 MVar |
| Time to reach steady state Var | 0.4095 sec | 0.2983 sec |

From the results, it is obvious that the adaptive control, of the- present invention achieves quicker response than the original (PRIOR ART) design. The needed reactive power amount is the same while the adaptive approach runs faster.

Change of $K_p$ and $K_i$

In this scenario, the other system parameters remain unchanged while the PI controller 304, 314 gains for the original control are changed to $K_{p\_v}=1$, $K_{i\_v}=1$, $K_{p\_i}=1$, $K_{i\_i}=1$.

The dynamic control gains, which are independent; of the initial values before the disturbance but depend on the post-fault conditionSi are given as:

$$K_{p\_V}(t) = \frac{80.1632 \times \Delta V(t)}{\Delta V(t) + 732.3115 \times \int_t^{t+T_S} Adt} \quad (36)$$

$$K_{i\_v}(t)=732.3115 \times K_{p\_v} \quad (37)$$

$$K_{p\_I}(t) = \frac{47.4959 \times \Delta I_q(t)}{\left(\Delta I_q(t) + 1.8232 \times \int_t^{t+T_S} Bdt\right)} \quad (38)$$

$$K_{i\_I}(t)=1.8233 \times K_{p\_I}(t) \quad (39)$$

Figure 10:
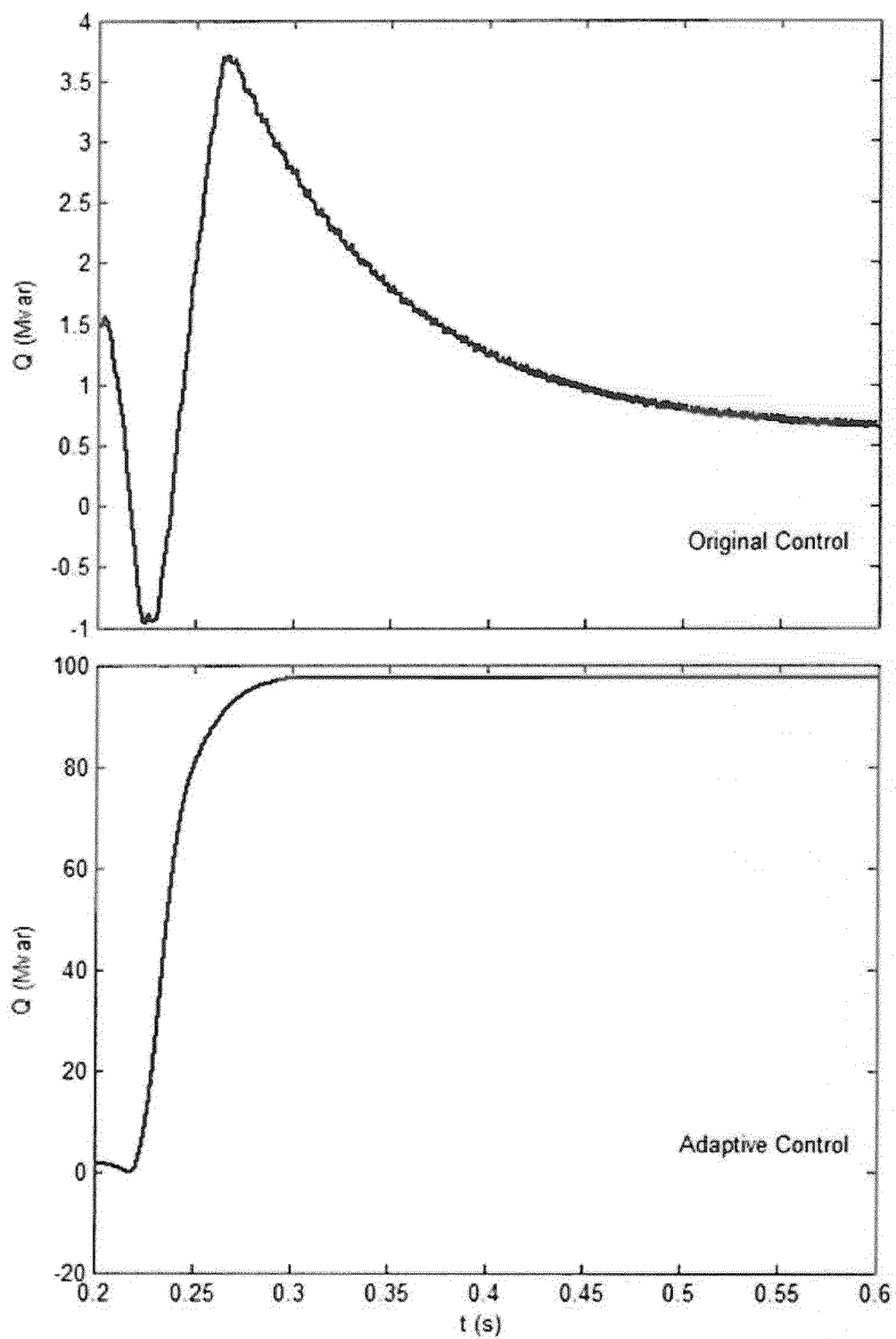
FIG. 10 provides graphical results of output reactive power with/changed $K_p$ and $K_i$ in the original control according to the present invention.

Based on (36) to (39), the adaptive control can be designed and the results of original control method and the adaptive control method are compared in FIG: 9 and FIG. 10, respectively.

Figure 9:
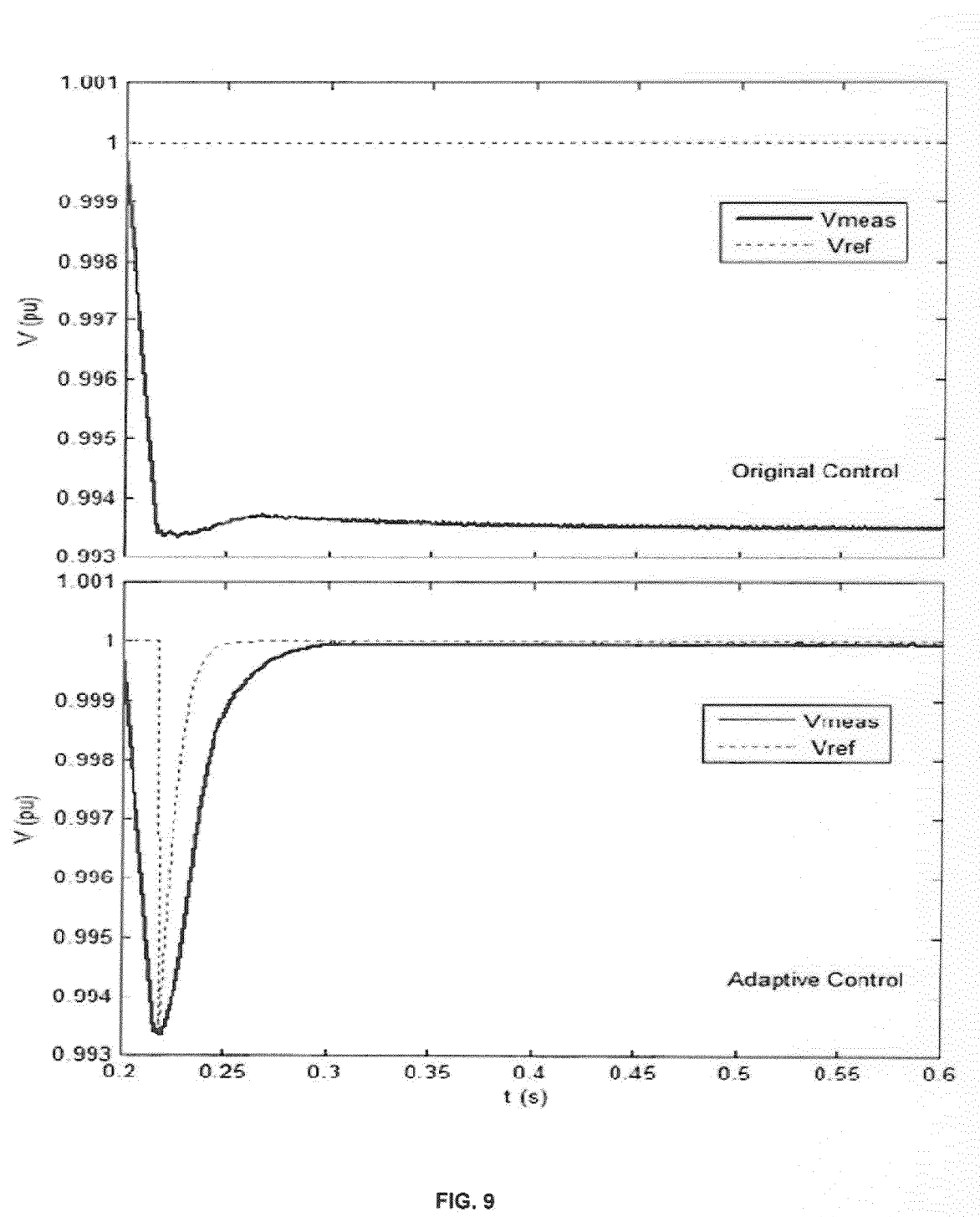
FIG. 9 provides graphical results of measured voltage with changed $K_p$ and $K_i$ in the original control according to the present invention.

From FIG. 9, it can be observed that when Kp and AT, are changed to different values, the original (PRIOR ART) control model cannot return the bus voltage to 1 p.u. and the STATCOM has poor response. The reactive; power cannot be increased to a level to meet the need. However, with the adaptive control of the present invention, theSTATCOM witkadaptive control responds to the disturbance as desired, and the voltage returns to 1 p.u. within 0.1 sec. FIG. 10 also shows that the reactive power injectioncannot be; continuously increased in the original control to support voltage.

Change of Load Disturbance

In this case, the original PI controller gains are unchanged, i.e., $K_{p\_v}$,12, $K_{i\_v}$=3000, $K_{p\_i}$=5, and $K_{i\_i}$=40. However, the load at Bus B1 is changed from 300 MW to 400 MW.

The dynamic control gains are given by:

$$K_{p\_V}(t) = \frac{93.3890 \times \Delta V(t)}{\Delta V(t) + 187.5579 \times \int_t^{t+T_S} Adt} \quad (40)$$

$$K_{i\_v}(t)=187.5579 \times K_{p\_v}(t) \quad (41)$$

$$K_{p\_I}(t) = \frac{8.1731 \times \Delta I_q(t)}{\left(\Delta I_q(t) + 13.1652 \times \int_t^{t+T_S} Bdt\right)} \quad (42)$$

$$K_{i\_I}(t)=13.1652 \times K_{p\_I}(t) \quad (43)$$

Figure 11:
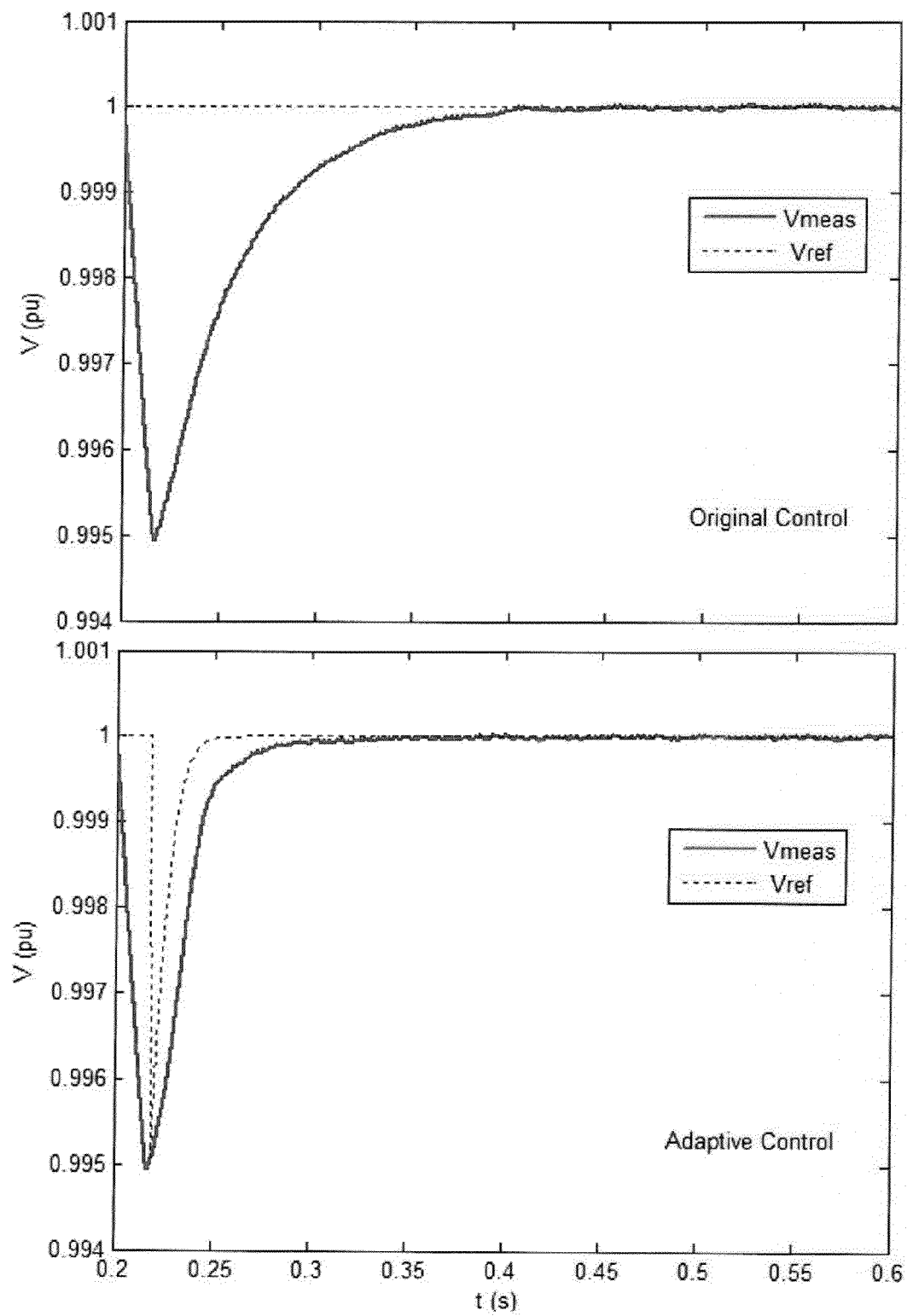
FIG. 11 provides graphical results of measured voltage which a change of load, according to the adaptive control of the present invention.
Figure 12:
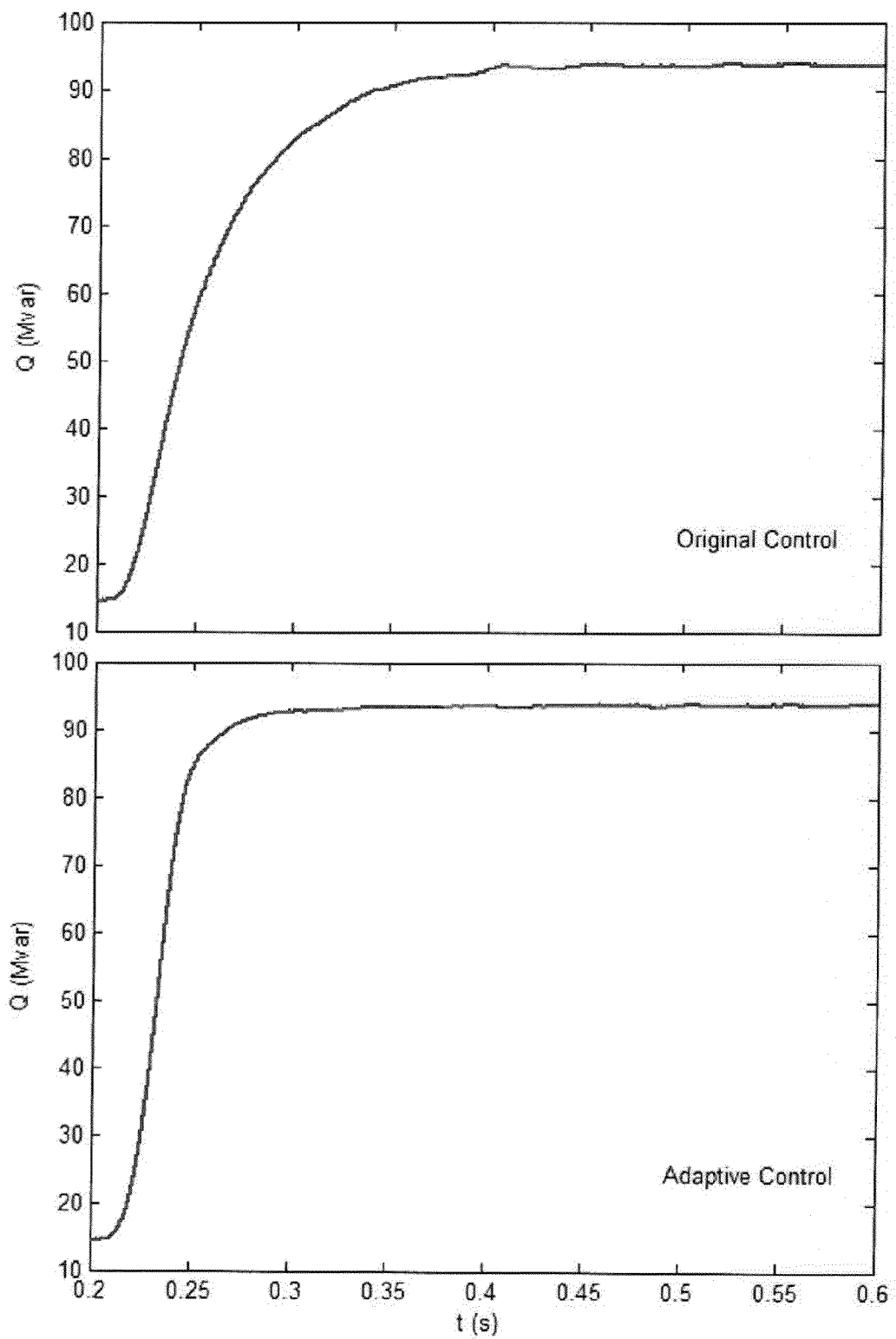
FIG. 12 provides graphical results of measured reactive power with change of load according to the adaptive control of the present invention.

Based on (40) to (43), the adaptive controller of the present invention can be designed for automatic reaction to change in loads. The. results from the original (PRIOR ART) method and the adaptive control method of the present invention are shown in FIG. 11 and FIG. 12, respectively. Table II lists a few key observations of the performance.

From the data shown in Table II below as well as FIGS. 11 and 12, it is obvious that the adaptive control achieves quicker response than the original (PRIOR ART) controller:

TABLE II

| | Original Control | Adaptive Control |
|---|---|---|
| Lowest Voltage after disturbance | 0.9949 p.u. | 0.9949 p.u. |
| Time (sec) when V = 1.0 | 0.4338 sec | 0.3125 sec |
| $\Delta t$ to reach V = 1.0 | 0.2338 sec | 0.1125 sec |
| Var Amount at steady state | 93.08 MVar | 92.72 MVar |
| Time to reach steady state VAr | 0.4338 sec | 0.3125 sec |

Change in Transmission Network

In this case, the Kp and Ki values remain unchanged, as in the original model, However, transmission line 1 is switched off to represent, a, different network which, may corresponds to scheduled transmission,maintenance. Here, we have $$K_{p\_V}(t) = \frac{18.3245 \times \Delta V(t)}{\Delta V(t) + 286.9512 \times \int_t^{t+T_S} Adt} \quad (44)$$

$$K_{i\_v}(t)=2869512 \times K_{p\_v}(t) \quad (45)$$

$$K_{p\_I}(t) = \frac{41.4360 \times \Delta I_q(t)}{\left(\Delta I_q(t) + 412.0153 \times \int_t^{t+T_S} Bdt\right)} \quad (46)$$

$$K_{i\_I}(t)=4120153 \times K_{p\_I}(t) \quad (47)$$

Figure 13:
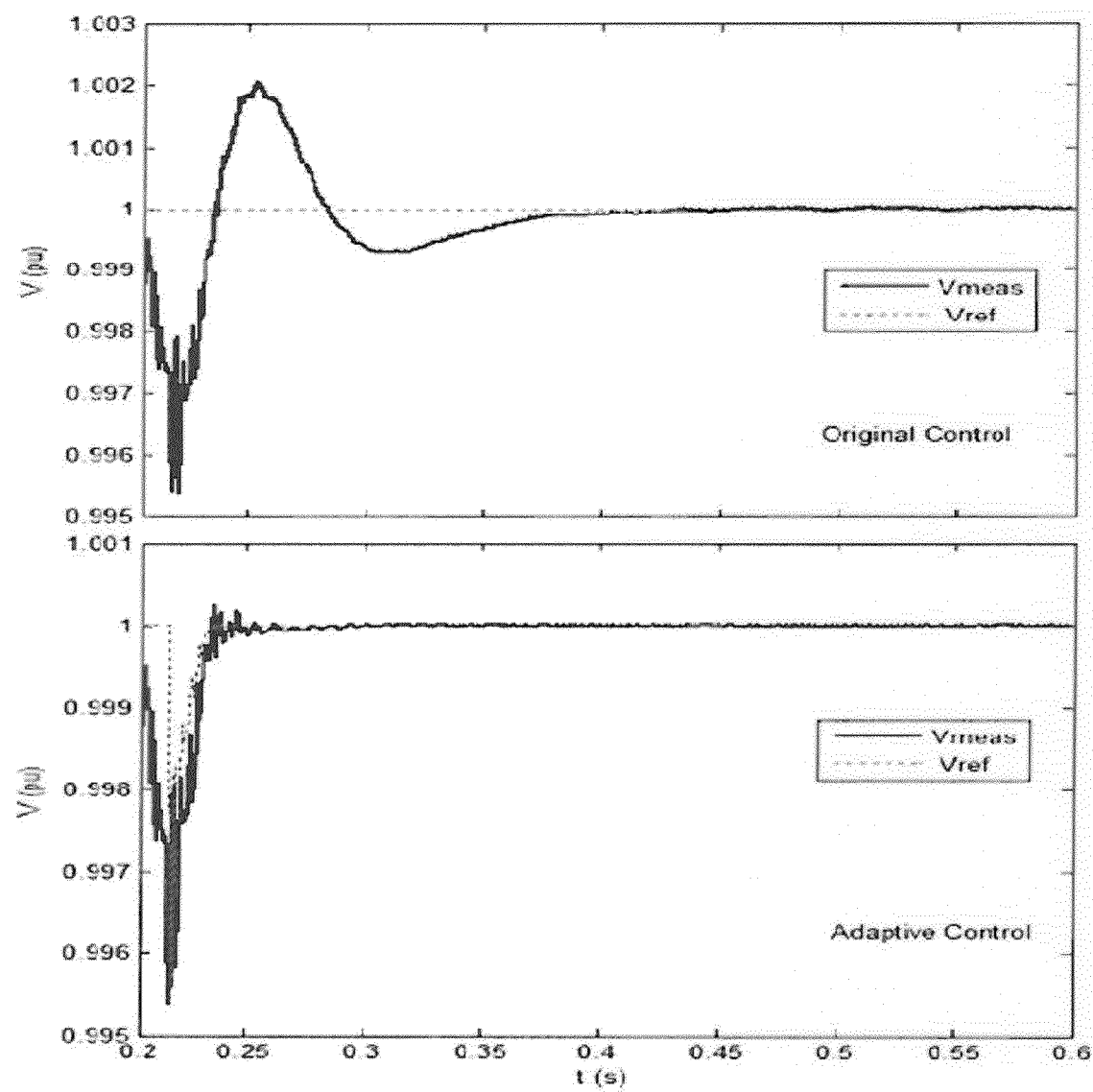
FIG. 13 provides graphical results of measured voltage with change of transmission network according to the adaptive control of the present invention.
Figure 14:
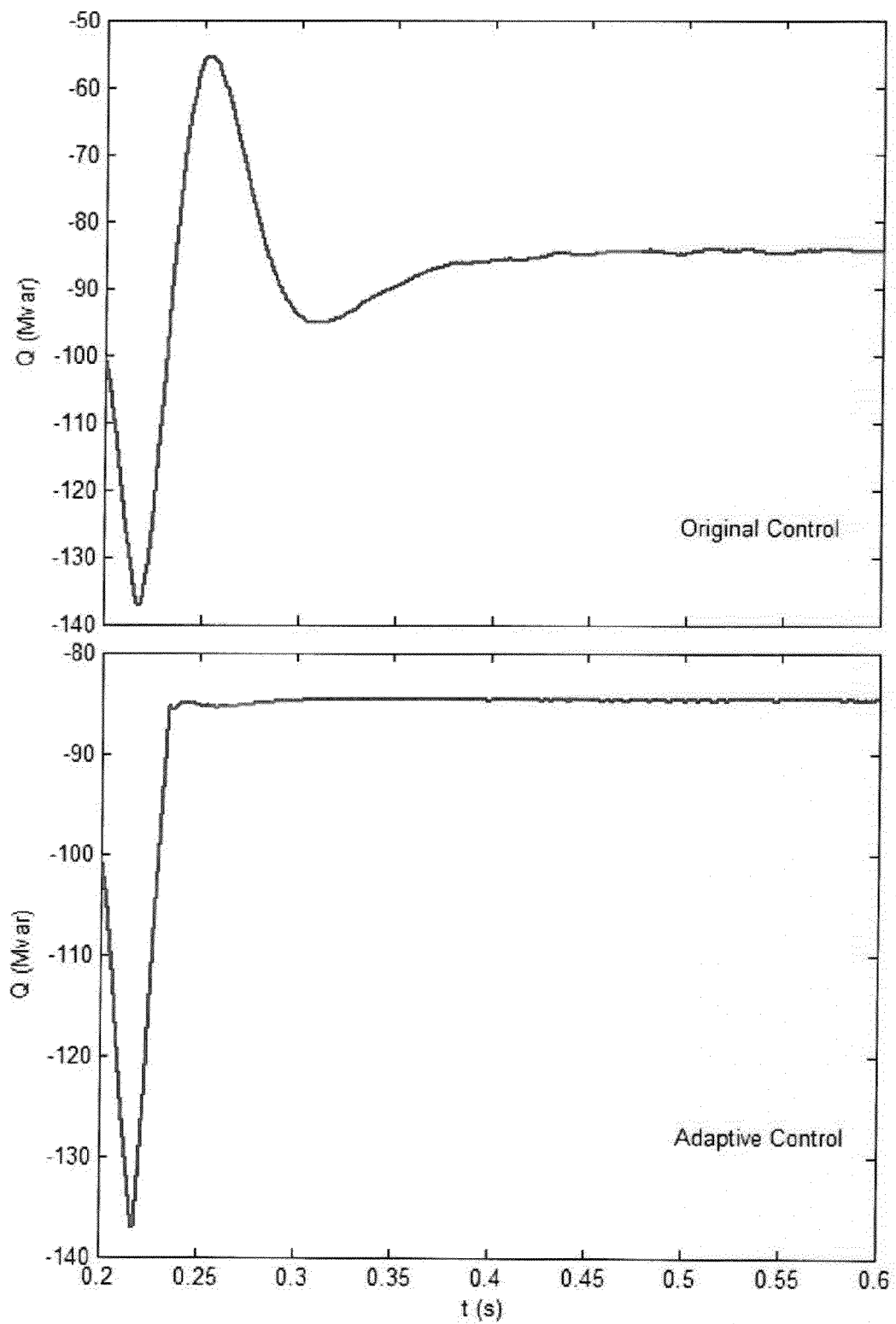
FIG. 14 provides graphical results of output reactive power with change of transmission network according to the adaptive control of the present invention.

Based on (44) to (47), the adaptive control model of the present invention can be designed to automatically react to changes in transmission network. The results from the original (PRIOR ART) STATCOM control method and adaptive control method of the present invention are shown in FIG. 13 and FIG. 14. Key observations are summarized in Table III, below. Note the STATCOM absorbs reactive power from the system in this; case. Here, the: disturbance is assumed to give a voltage rise at the source (substation) from 10 to 1.01 p.u.; meanwhile, the system has a transmission line removed which tends to lower the voltages. The overall impact leads to a voltage rise to higher than 1.0 at the.STATCOM bus in the steady state, if the STATCOM is not activated. Thus, the STATCOM needs to absorb teactive power in the; final steady-state to reach 1.0 p.u. voltage at the; controlled bus. Also note that the initial transients immediately after 0.2 sec lead to ah over-absorption by the STATCOM. As shown in FIG. 13 and FIG. 14, the original (PRIOR ART) STATCOM control model takes longer time and more swings to bring the bus voltage back to 1.0 p.u. while the adaptive control method of the present invention takes the voltage back to 1.0 p.u. much quicker and smoother without swings. See Table III below.

TABLE III

| | Original Control | Adaptive Control |
| --- | --- | --- |
| Lowest Voltage after disturbance | 0.9954 p.u. | 0.9954 p.u. |
| Time (sec) when V = 1.0 | 0.4248 sec | 0.2744 sec |
| Δt to reach V = 1.0 | 0.2248 sec | 0.0744 sec |
| Var Amount at steady state | −84.92 MVar | −85.02 MVar |
| Time to reach steady state Var | 0.4248 sec | 0.2744 sec |

The adaptive control response of the present invention remains unchanged under this disturbance, while the original control method of the PRIOR ART yields a delayed response with significant overshoot. Hence, the advantage of the adaptive control method is clearly demonstrated.

Summary of Results of Simulation

From the four case studies shown from paragraph [0072] to [0085], it is evident that the adaptive control achieves faster response. More important, the response of the proposed adaptive control is almost; identical under various conditions, including a change of load, a change of (initial) control gains, and a change of network topology. As a comparison, the response curve of the original control model varies greatly under a change of system operating condition and worse, may not correct the voltage to the expected value.

The advantage of the proposed adaptive control approach is expected because the control gains are dynamically and autonomously adjusted during thevoltage cortection process, therefore, the desired performance can be achieved. However, the original fixed PI controller may be tuned for the given operating condition,; but may be inefficient, of simply unable to correct voltage under other operating conditions.

Thus it has been shown that a STATCOM with adaptive control according to the, present invention can provide fast and efficient reactive power support to maintain power system voltage stability in comparison with known STATCOM control. In the literature, various STATCOM, control methods are discussed including many applications of PI controllers. However, these previous non-patent literature works obtain the PI gains via a trial and error approach or extensive studies with a tradeoff of performance and applicability. Control parameters for the optimal performance at a given operating point may not be effective at a different operating point.

To address the challenge, an adaptive control model according to be present invention based on adaptive PI control self-adjusts the proportional and integral control gains, during a disturbance, automatically. Thus, the control gains are dynamically adjusted such that the performance matches a pre-rdefined desired response isuch as that of FIG. 4, regardless of the change of operating condition Since the: adjustment isautbndmdus.this gives a "plug and play" capability for STATCOM operation.

In the simulation discussed above, the proposed adaptive control for STATCOM of the present invention is compared with the conventional (PRIOR ART) STATCOM control with pre-tuned fixed PI gains to verify the advantages of the present method. The results show that the adaptive control gives consistent excellence under various operating conditions such as different initial control gains, different load levels, and change of transmission network. In contrast, the conventional STATCOM control with fixed PI gains may perform acceptably, in a given power system, but suffer significant problems when there is a change of the system conditions.

Multiple STATCOM's with adaptive control may operate together in a connected plurality of power systems when interaction among different STATCOM's may affect each other's operation. Also, extension to other power system control problems than those discussed or simulated above may also provide improved.performance over a conventional STATCOM.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is -sufficiently flexible and configurable, such that it may be implemented in ways other than that shown in the accompanying figures.

Further, the purpose of the foregoing Abstract is to enable the U.S. Patent and Trademark Office and thepublic generally arid especially the scientists, engineers and; practitioners in the. relevant art(s) who are not familiar with,patent or legal terms or phraseology, to determine quickly from a cursory inspection the nature and essence; of this technical-disclosure. The Abstract is not intended to be limiting as to the scope of the present invention in any way.

What is claimed is:

1. Apparatus for adaptive control for use with a static compensator (STATCOM) for a power system, the adaptive control apparatus comprising:

a voltage regulator outer loop and a current regulator inner loop;

the voltage regulator outer loop comprising a comparator configured to compare a desired reference voltage value to a measured voltage value at a point of interest for voltage control, a proportional integral controller in the voltage regulator loop outputting a q-axis current, a minimum-maximum current limiter whose input is the q-axis current output from the proportional integral controller, and an adjustment circuit for adjusting the proportional and integral gains of the voltage regulator loop according to the comparison; and the current regulator inner loop comprising an inner loop comparator configured to compare the q-axis reference current value which is the output of the minimum-maximum current limiter circuit in the voltage regulator outer loop with the q-axis current to adjust phase angle, a proportional integral controller, a minimum-maximum phase angle limiter, and an adjustment circuit for adjusting the proportional and integral gains of the proportional controller of current regulator loop according to the comparison.

2. Apparatus as recited in claim 1 wherein the desired reference voltage value is initially a desired steady state value and, thereafter, represented as a desired reference voltage curve over time returning to the desired steady state value.

3. Apparatus as recited in claim 1, the proportional integral controller of the voltage regulator outer loop being responsive to the adjusted proportional and integral gains.

4. Apparatus as recited in claim 3, the adjustment circuit being responsive to the outer loop comparator and connected to the proportional integral controller for adjusting proportional and integral parts of the voltage regulator gains.

5. Apparatus as recited in claim 1, the proportional integral controller of the current regulator inner loop being responsive to the adjusted proportional and integral gains.

6. Apparatus as recited in claim 5, the adjustment circuit being responsive to the inner loop comparator and connected to the proportional integral controller for adjusting proportional and integral parts of the current regulator gains.

7. Apparatus as recited in claim 1 wherein the point of interest for voltage control is a power system bus.

8. A method for adaptive control for use with a static compensator for a power system, the adaptive control method comprising:

measuring a voltage at a point of interest for voltage control in the power system, comparing the measured voltage with a desired steady-state voltage value, if the measured voltage does not compare with the desired steady-state voltage value, activating an adaptive control process, comparing the measured voltage with a desired reference value over time, if the measured voltage does not compare with the desired reference value over time, obtaining a q-axis reference current value via a voltage regulator outer loop if the measured voltage is not equal to the desired reference value over time by adjusting proportional and integral parts of voltage regulator gains of a proportional integral controller of the voltage regulator outer loop and outputting a q-axis current value to a current regulator inner loop, and one of injecting and absorbing reactive power from a static compensator into the power system via the current regulator inner loop if the q-axis reference current value does not compare with a measured q-axis current, the current regulator inner loop comprising a minimum-maximum phase angle limiter and a proportional integral controller having proportional and integral gains adjusted to the comparison, the current regulator inner loop outputting a phase angle.

9. The method of claim 8 further comprising defining $$V_{ref}(t) = V_{ss} - (V_{ss} - V_m(t))e^{-\frac{t}{\tau}};$$

and $\Delta V(t) = V_{ref}(t) - V_m(t)$, where $V_m(t)$ is the measured voltage, $\Delta V(t)$ is the change in voltage over time, $V_{ss}$ is the steady-state voltage set at approximately 1.0 p.u., and $V_{ref}(t)$ is a desired reference voltage curve over time returning to the steady-state voltage.

10. The method of claim 8 wherein the change in voltage over time is controlled to be within a small tolerance threshold $V_\epsilon$ compared with steady state voltage $V_{ss}$ set at approximately 1.0 p.u. in comparison with a reference voltage curve comprising one of a linear, an exponential, a quadratic, a polynomial, and a step function curve so long as the reference voltage curve returns rapidly to $V_{ss}$.

11. The method of claim 8 further comprising adjusting voltage proportional and integral parts of voltage regulator gains in the voltage regulator inner loop and outputting a q-axis current value to the current regulator inner loop responsive to the adjusting of voltage proportional and integral parts of voltage regulator gains in the voltage regulator outer loop.

12. The method of claim 8 further comprising adjusting current proportional and integral parts of current regulator gains in the current regulator inner loop and outputting a phase angle responsive to the adjusting of current proportional and integral parts of current regulator gains in the current regulator inner loop.

13. The method of claim 8 wherein the point of interest for voltage control is a power system bus.

14. An adaptive controller for use with a static compensator (STATCOM) configured to enhance voltage stability in an electrical system network, the adaptive controller comprising an outer voltage regulator loop and an inner current regulator loop connected to an output of the outer voltage regulator loop, each of the outer loop and the inner loop comprising a proportional integral controller;

the outer voltage regulator loop adjusting proportional and integral parts of voltage regulator gains responsive to a comparison of a desired reference voltage to a measured voltage at a point of interest;

the inner current regulator loop adjusting proportional and integral parts of current regulator gains responsive to a comparison of a reference current output of the outer voltage regulator loop and a desired current, the inner current regulator loop outputting a phase angle resulting in one of automatic injection and absorption of reactive power from the STATCOM to a coupled electrical system network when a measured voltage at a point of interest for voltage control in the electrical system network is not equal to a desired steady state voltage.

15. The adaptive controller of claim 14 wherein the desired reference voltage curve over time represents a curve whereby, when a desired steady-state voltage is not measured at a point in the electrical system network, the curve represents a desired return to the steady-state voltage after a short period of time.

16. The adaptive controller of claim 14 wherein the point of interest for voltage control in the electrical system network comprises an electrical system bus.

17. The adaptive controller of claim 14, the outer voltage regulator loop outputting a q-axis reference current value for comparison with a measured q-axis current value.

18. The adaptive controller of claim 14, the inner current regulator loop outputting a phase angle.

19. The adaptive controller of claim 18, the one of automatic injection and absorption of reactive power being responsive to the output phase angle.

20. The adaptive controller of claim 14, the outer voltage regulator loop comprising a current limiter and the inner current regulator loop comprising a phase angle limiter.

* * * * *